(12) United States Patent
El Idrissi

(10) Patent No.: US 11,993,201 B2
(45) Date of Patent: May 28, 2024

(54) METHOD FOR CONTROLLING MODULES FOR PROJECTING PIXELATED LIGHT BEAMS FOR A VEHICLE

(71) Applicant: VALEO VISION, Bobigny (FR)

(72) Inventor: Hafid El Idrissi, Bobigny (FR)

(73) Assignee: VALEO VISION, Bobigny (FR)

( * ) Notice: Subject to any disclaimer, the term of this patent is extended or adjusted under 35 U.S.C. 154(b) by 437 days.

(21) Appl. No.: 17/281,859

(22) PCT Filed: Sep. 30, 2019

(86) PCT No.: PCT/EP2019/076482
§ 371 (c)(1),
(2) Date: Mar. 31, 2021

(87) PCT Pub. No.: WO2020/070078
PCT Pub. Date: Apr. 9, 2020

(65) Prior Publication Data
US 2022/0118901 A1    Apr. 21, 2022

(30) Foreign Application Priority Data
Oct. 1, 2018  (FR) ...................................... 18 59087

(51) Int. Cl.
*B60Q 1/08* (2006.01)
*B60Q 1/00* (2006.01)
*G08G 1/16* (2006.01)

(52) U.S. Cl.
CPC .............. *B60Q 1/08* (2013.01); *B60Q 1/0023* (2013.01); *G08G 1/167* (2013.01); *B60Q 2300/136* (2013.01); *B60Q 2400/50* (2013.01)

(58) Field of Classification Search
CPC .. B60Q 1/08; B60Q 1/0023; B60Q 2300/136; B60Q 2400/50; B60Q 9/008;
(Continued)

(56) References Cited

U.S. PATENT DOCUMENTS

2013/0173232 A1* 7/2013 Meis ...................... G08G 1/167
                                                            703/2
2018/0086254 A1* 3/2018 Morel ...................... B60Q 1/04

FOREIGN PATENT DOCUMENTS

CN      107161076 A      9/2017
CN      107369336 A     11/2017
(Continued)

OTHER PUBLICATIONS

International Search Report dated Nov. 7, 2019 in PCT/EP2019/076482 filed on Sep. 30, 2019, 3 pages.
(Continued)

*Primary Examiner* — Abdullah A Riyami
*Assistant Examiner* — Syed M Kaiser
(74) *Attorney, Agent, or Firm* — Oblon, McClelland, Maier & Neustadt, L.L.P.

(57) ABSTRACT

Method for controlling modules for projecting pixelated light beams of a host vehicle. The host vehicle includes a step of determining, using a control device and according to the collected data, a polynomial function which models the profile of the edge and the centre of the road, such that the road profile is modelled based on a polynomial function, the degree of which depends on the curvature of the road. Also included is a step of determining, by means of the control device, a starting point (Pd) and an arrival point (Pa) of an area for projection (ZPd, ZPg, ZP) of patterns, and a step of determining, by means of the control device, a distance (De) between an axis (Ac) of a data/image acquisition means and the patterns, respectively for a right projection area ZPd and a left projection area ZPg. The control device is used to determine the width (Lm) of the pattern.

20 Claims, 6 Drawing Sheets

(58) Field of Classification Search
CPC ...... G08G 1/167; B60W 30/12; B60W 40/11; B60W 2420/42; B60W 2420/52; B60W 2520/16; B60W 2552/20; B60W 2552/50; B62D 15/0265; B62D 15/0295; B60Y 2300/12; B60Y 2400/30
See application file for complete search history.

(56) References Cited

FOREIGN PATENT DOCUMENTS

| | | | |
|---|---|---|---|
| CN | 107878300 A | 4/2018 | |
| CN | 108216242 A | 6/2018 | |
| DE | 10 2011 119 923 A1 | 5/2013 | |
| DE | 102011119923 A1 * | 5/2013 | ............. B60Q 1/085 |
| DE | 20 2013 006 071 U1 | 11/2013 | |
| DE | 10 2015 201 764 A1 | 8/2016 | |
| DE | 10 2015 201 766 A1 | 8/2016 | |
| DE | 10 2016 006 919 A1 | 2/2017 | |
| DE | 10 2016 223 650 A1 | 5/2018 | |
| EP | 3 147 821 A1 | 3/2017 | |
| FR | 3 055 979 A1 | 3/2018 | |
| FR | 3062217 A1 * | 7/2018 | ........... B60Q 1/0017 |
| JP | 2009-143413 A | 7/2009 | |
| JP | 2012-247369 A | 12/2012 | |
| WO | WO 2018/162219 A1 | 9/2018 | |

OTHER PUBLICATIONS

Japanese Office Action dated Jul. 28, 2023 in Japanese Application No. 2021-517983 (with English Translation), 8 pages.

Combined Chinese Office Action and Search Report issued Dec. 12, 2023, in corresponding Chinese Patent Application No. 201980065120.0 (with English Translation of Category of Cited Documents), 10 pages.

* cited by examiner

METHOD FOR CONTROLLING MODULES FOR PROJECTING PIXELATED LIGHT BEAMS FOR A VEHICLE

The present invention relates to a method for controlling modules for projecting pixelated light beams for a vehicle. It is particularly applicable to the control of these projection modules so as to allow assistance in driving a vehicle.

Nowadays, a motor vehicle generally comprises a set of light beam projection modules, generally left and right, limited to the basic functions of lighting and/or signaling means, smart to a certain extent, when driving at night or with low visibility, and/or in a context of adverse weather conditions.

A light beam projection module may be associated with one or more functions such as the "high-beam" function for illuminating the road or its edges with high intensity, and/or with the "low-beam" function for illuminating the road or its edges at shorter range without dazzling other users coming in the opposite direction.

Among the known driving assistance systems for motor vehicles associated with light beam projection modules, there is in particular the automatic switching on of the low beam in the case of insufficient outside light, and/or the automatic switching of the high beam to low beam to avoid dazzling other road users.

The rise in the use of projection modules based on high-definition resolutions in the automotive world, such as modules based on DMD, monolithic LED, LCD or laser scanning technology, promise new possibilities and push the boundaries of what is possible ever further. It is therefore necessary to provide new functionalities to the driver and/or to the passengers of a motor vehicle provided with these new means.

The present invention aims to provide better visual comfort to the driver and/or to the passengers of a motor vehicle by providing them with new driving assistance functionalities for new user experiences.

A first aspect of the invention relates to a method for controlling modules for projecting pixelated light beams from a host vehicle, comprising
  a set of sensors
  at least one device for controlling light beam projection modules, characterized in that it comprises the following steps:
  a step in which data/image acquisition means are able to collect a set of data required to model a profile of a road stretching in front of the host vehicle;
  a step in which the control device is able, according to the data collected, to determine a polynomial function modeling the profile of the edge and of the center of the road;
  a step in which the control device determines a starting point Pd and an end point Pa of a zone for the projection of patterns;
  a step in which the control device determines a distance Dc between an axis of the data/image acquisition means and the patterns, respectively for a right projection zone and a left projection zone;
  a step in which the control device determines the width Lm of the pattern.

In one embodiment, the data/image acquisition means able to collect the data required to model the profile of the road is a camera, and/or a radar, and/or a lidar; According to one embodiment of the invention, the modeling of the profile of the road results from a first degree polynomial function, of the form $y=f(x)=B_i.x+A_i$, when said profile of the road is rectilinear;

According to one embodiment, the modeling of the profile of the road results from a second degree polynomial function, of the form $y=f(x)=C_i.x^2+B_i.x+A_i$, when said profile of the road is parabolic, such as a turn;

In one embodiment of the invention, the modeling of the profile of the road results from a third degree polynomial function, of the form $y=f(x)=D_i.x^3+C_i.x^2+B_i.x+A$, when said profile of the road comprises an inflection point, such as a succession of two turns;

In one embodiment, when the image/data acquisition means detects an obstacle, it transmits, to the control device, the data relating to the obstacle in order to define a safety margin so as to prevent patterns from being projected onto the obstacle;

In one embodiment, the distance Dc is parameterizable according to the type of pattern projected;

In one embodiment, when the distance Dc=0, the control device controls the projection modules such that the patterns of the right and left projection zones are superposed, in one and the same projection zone;

In another embodiment, the patterns able to be projected into the projection zone may be circles, squares, triangles, rectangles, chevrons, arrows, or more complex shapes, or numbers such as the display of a speedometer, or continuous or broken lines;

In another embodiment, the control device is able to dynamically increase the width Lm of the patterns projected farthest away onto the road in order to correct the effect of perspective;

In another embodiment, the control device is associated with a set of sensors able to determine the pitch of the host vehicle configured so as to compensate the mechanical and/or digital calibration of the projection modules;

In one embodiment, the control device is able to compensate the light intensity according to the distance of projection of the patterns and the "flat-beam" base beam;

In another embodiment, the control device associated with the data/image acquisition means is configured so as to determine whether the outline of the host vehicle is able to pass between two obstacles by projecting said outline between the two obstacles;

In one embodiment, the orientation of the projection of the outline of the host vehicle is dynamically related to the angle of the steering system of said host vehicle;

In another embodiment, the control device associated with the data/image acquisition means is able to project an obstacle avoidance strategy;

In another embodiment, the control device associated with the data/image acquisition means is able to project a set of patterns configured so as to establish a trajectory for the host vehicle when the lane narrows in the area of works;

In another embodiment, the control device, associated with the "GPS" navigation system of the vehicle, is able to project a change of trajectory, in the form of arrows on the ground, for the host vehicle;

Another aspect of the invention relates to a lighting device for a motor vehicle intended to be controlled by a control device able to implement the method for controlling modules for projecting pixelated light beams according to any one of the preceding features;

In another embodiment, a device for fusion of information is able to determine the relevance of each datum from the various sensors associated with the host vehicle, in order to transmit reliable data for aiding in decision making to the control device.

Other features and advantages of the invention will become apparent from examining the following detailed description and the appended drawings, in which.

Figure 1:
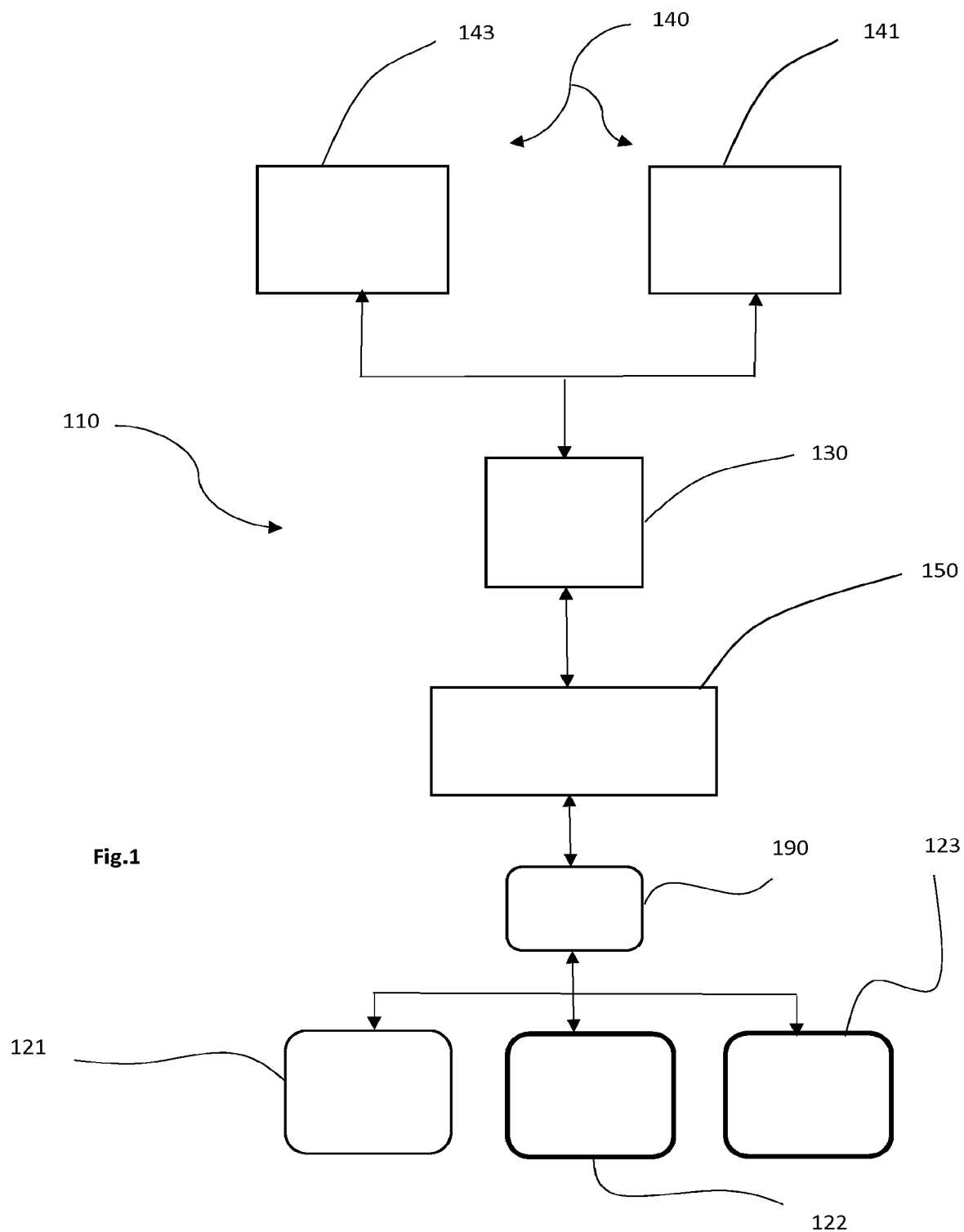
FIG. 1 illustrates a system according to one embodiment of the invention.

FIG. 1 shows a motor vehicle 100 comprising a system 110 comprising a set of sensors 120, at least one device 130 for controlling modules 140 projecting light beams, said control device 130 being connected to the control unit 150 of the vehicle 100. Said control device 130 comprises at least one microcontroller associated with one or more memories and a graphics processing unit. In the rest of the description, the motor vehicle 100 comprising such a system 110 will be referred to hereinafter as a host vehicle 100.

The projection module 140 is a high-resolution module, in other words one having a resolution higher than 1000 pixels. However, no restriction is attached to the technology used to produce the projection modules 140.

A projection module 140 may for example comprise a monolithic source. What is meant by a monolithic source is a monolithic matrix array of electroluminescent elements arranged in at least two columns by at least two rows. In a monolithic matrix array, the electroluminescent elements may be grown from a common substrate and may be electrically connected so as to be able to be activated selectively, individually or by subset of electroluminescent elements. The substrate may be made predominantly of semiconductor material. The substrate may comprise one or more further materials, for example non-semiconductor materials (metals and insulators). Each electroluminescent element or group of electroluminescent elements may thus form a luminous pixel and is able to emit light when its or their material is supplied with electricity. The configuration of such a monolithic matrix array makes it possible to arrange selectively activatable pixels very close to each other, in comparison with conventional light-emitting diodes that are intended to be soldered onto printed circuit boards. The monolithic matrix array may comprise electroluminescent elements a main dimension of elongation of which, specifically the height, is substantially perpendicular to a common substrate, this height being equal to one micrometer.

The one or more monolithic matrix arrays, able to emit light rays, may be coupled to the control device 130 so as to control the generation and/or the projection of a pixelated light beam by the projection module 140.

The control device 130 is thus able to individually control the light emission of each pixel of a matrix array.

As an alternative to what has been presented above, the projection module 140 may comprise a light source coupled to a matrix array of mirrors. Thus, the pixelated light source may be formed by the assembly of at least one light source formed of at least one light-emitting diode emitting light and a matrix array of optoelectronic elements, for example a matrix array of micromirrors, also known by the acronym DMD, for "digital micromirror device", which directs the light rays originating from the light source by reflection toward an optical projection element. Where appropriate, an optical collection element may make it possible to collect the rays from at least one light source in order to concentrate them and to direct them toward the surface of the matrix array of micromirrors.

Each micromirror is able to pivot between two fixed positions, a first position in which the light rays are reflected toward the optical projection element, and a second position in which the light rays are reflected in a direction other than the optical projection element. The two fixed positions are oriented in the same way for all of the micromirrors and form, with respect to a support reference plane of the matrix array of micromirrors, an angle characteristic of the matrix array of micromirrors, defined in the specifications thereof. Such an angle is generally less than 20° and may usually have a value of about 12°. Thus, each micromirror reflecting a portion of the light rays incident on the matrix array of micromirrors forms an elementary emitter of the pixelated light source, the actuation and control of the change in position of the mirrors making it possible to selectively activate this elementary emitter in order to emit or not to emit an elementary light beam.

As another variant, the light beam projection module may be formed by a laser scanning system in which a laser source emits a laser beam toward scanning means that are configured so as to scan, with the laser beam, the surface of a wavelength element converter, which surface is imaged by the optical projection element. The scanning of the beam may be brought about by the scanning means at a speed high enough that the human eye does not perceive its movement in the projected image.

The synchronized control of the activation of the laser source and of the scanning motion of the beam makes it possible to generate a matrix array of elementary emitters which are selectively activatable at the surface of the wavelength converter element. The scanning means may be a mobile micromirror for scanning the surface of the wavelength converter element through reflection of the laser beam. The micromirrors mentioned as scanning means are, for example, of MEMS (microelectromechanical system) type. However, the invention is not limited to such a scanning means, and may use other types of scanning means, such as a series of mirrors arranged on a rotary element, the rotation of the element causing the transmission surface to be scanned by the laser beam.

As another variant, the light source may be a matrix array and comprise at least one segment of light elements, such as light-emitting diodes or a surface portion of a monolithic light source.

Figure 2:
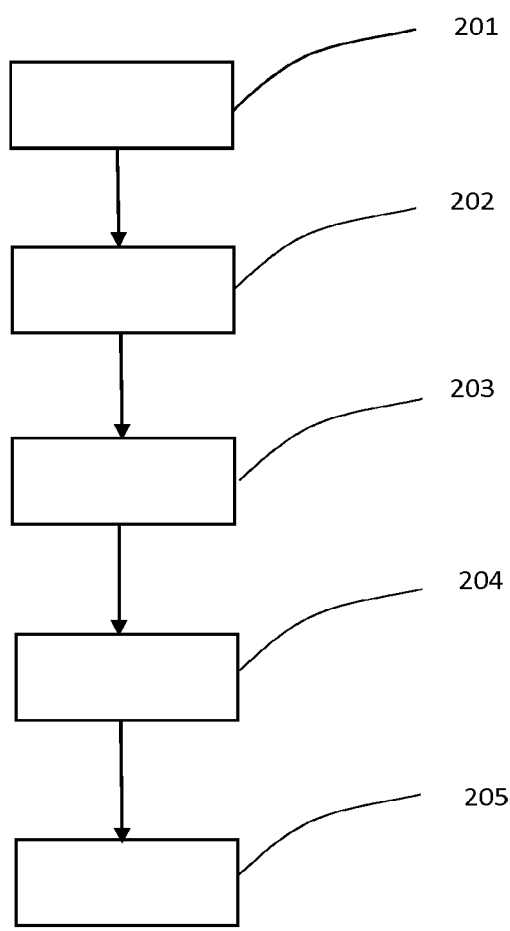
FIG. 2 is a diagram illustrating the steps of a method according to the invention.
Figure 3:
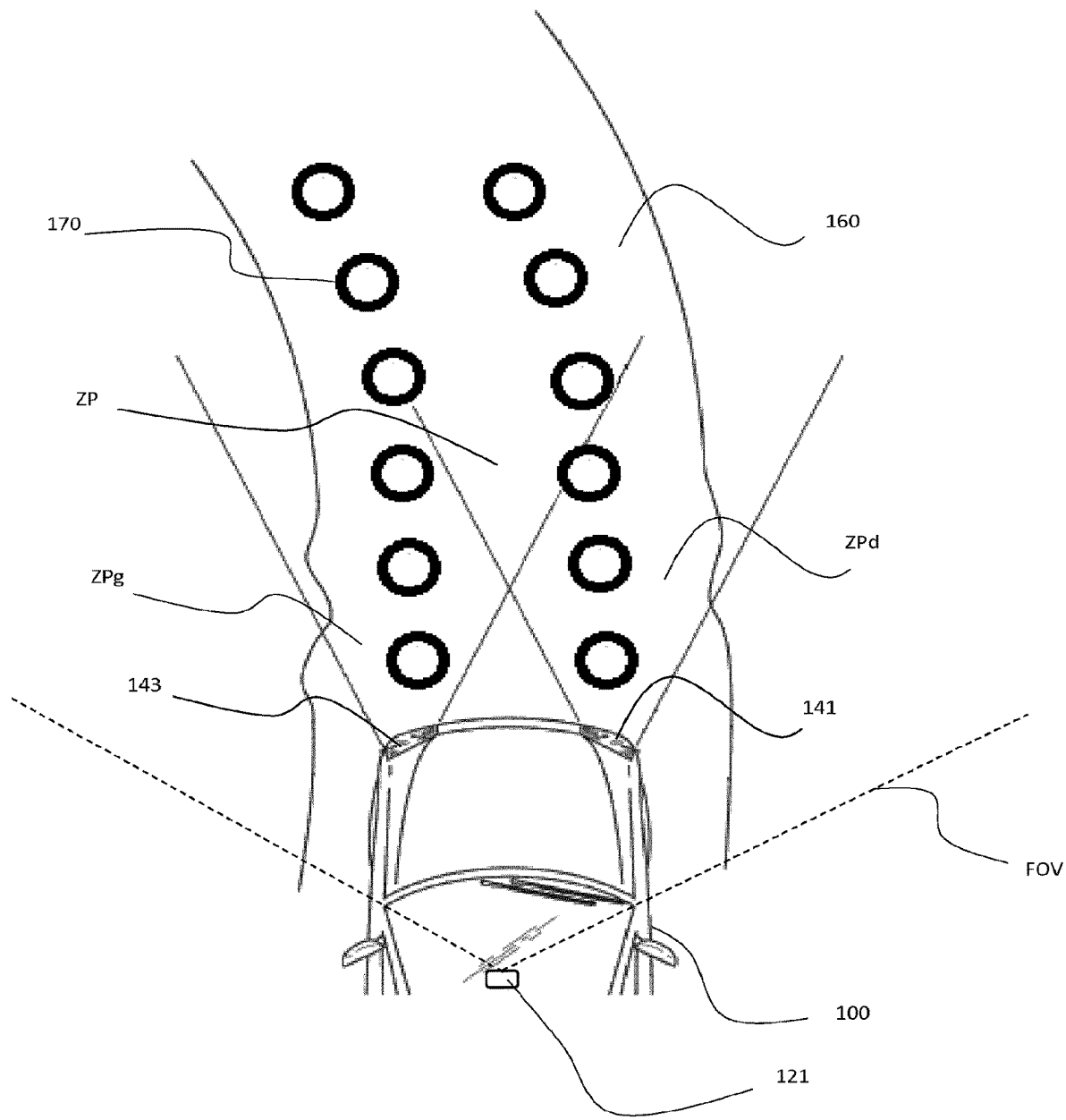
FIG. 3 illustrates the implementation of the method according to the invention in a first driving situation.
Figure 4:
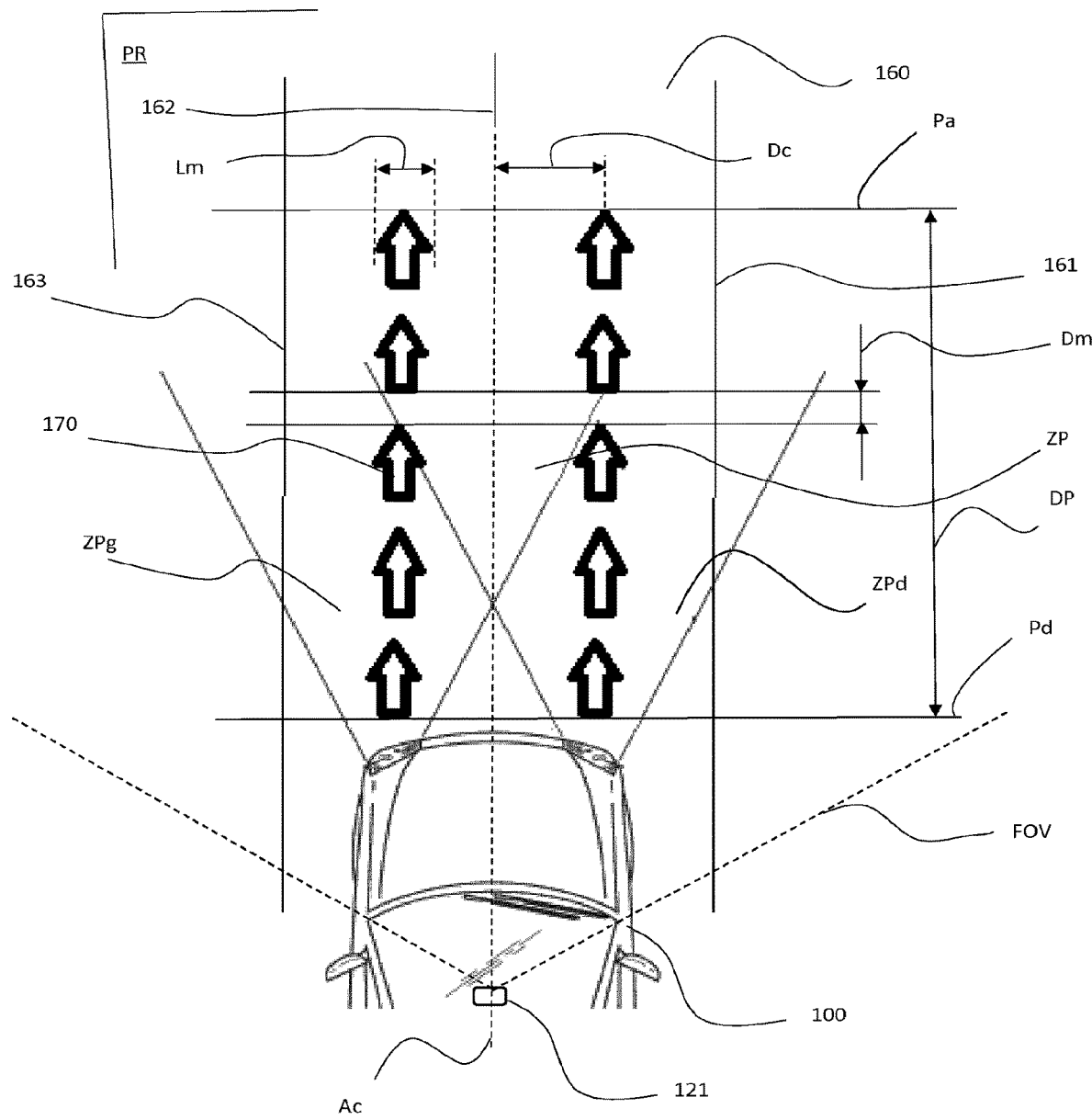
FIG. 4 illustrates the implementation of the method according to the invention in a second driving situation.
Figure 5:
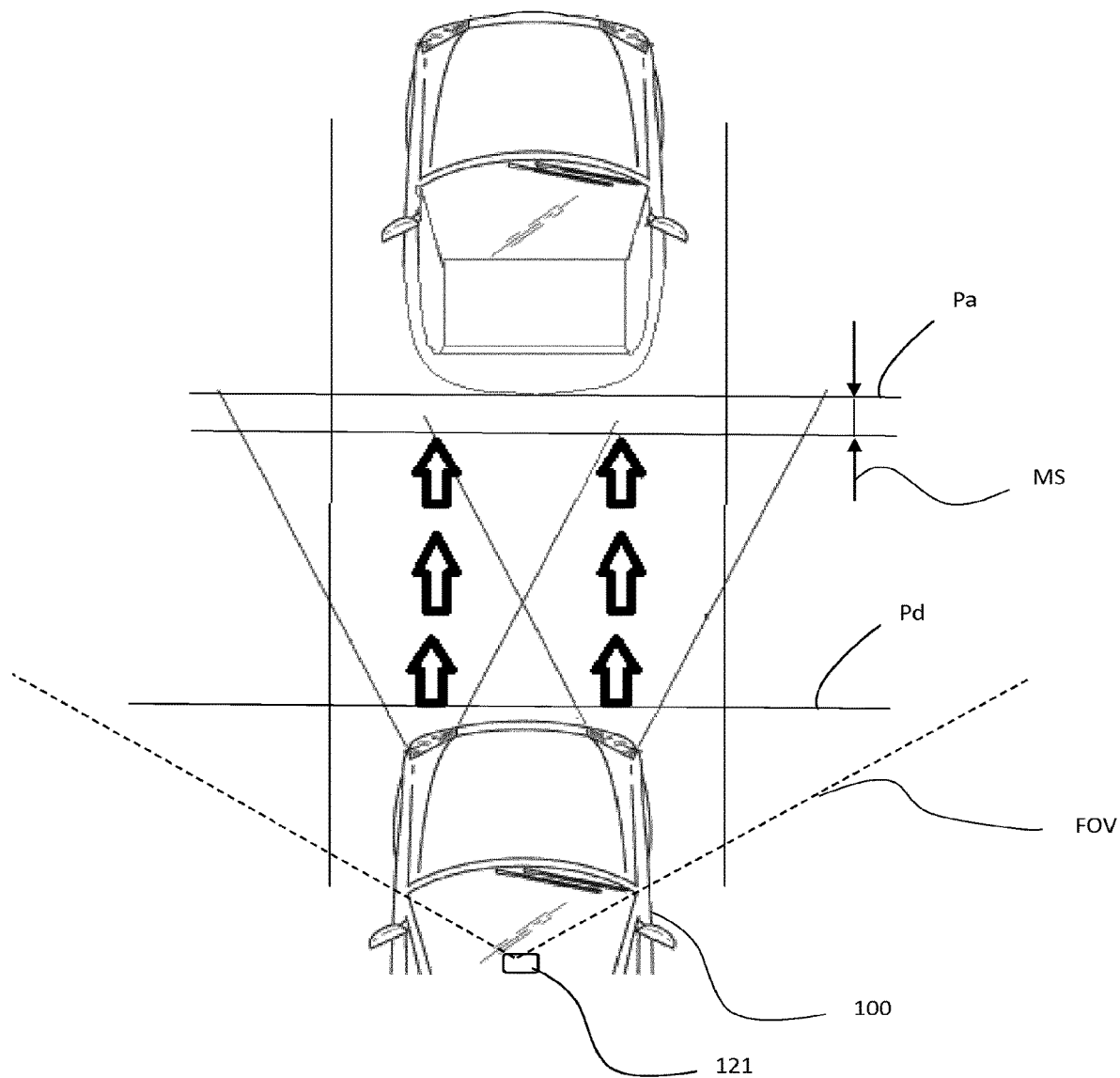
FIG. 5 illustrates the implementation of the method according to the invention in a third driving situation.

FIG. 2 illustrates the steps of a method implemented by the one or more sensors and by the control device 130.

In a step 200, the method begins, for example when starting up the host vehicle or when the high-beam or low-beam function is activated.

In a step 201, the set of sensors 120 of the host vehicle is able to collect a set of data. In particular, at least one of the sensors is configured so as to collect the data required to model the profile of the road. The data collected and the accuracy of this data depend on the nature of the one or more sensors, whether it is a camera, a radar, or a lidar.

Known modeling methods may be applied with a view to estimating the profile of the road, according to the images and/or data acquired by a camera, and/or a radar, and/or a lidar. To facilitate understanding of the method and system according to the invention, only one camera 121 will be shown, and its operation and its interaction with all of the other elements of the system 100 will be described below. It should however be noted that this camera 121 is shown schematically in FIGS. 3 to 6 as being located at the height of the central rear-view mirror of the vehicle. A totally different location for the camera and/or for the other means for acquiring data and/or images relating to the road 160 stretching in front of the host vehicle may also be envisaged. However, it should be obvious that a different location for these said means will require a person skilled in the art to determine the various parameters and constants which will be described below according to this new frame of reference.

The present invention more specifically provides, in a step 202, for determining a polynomial function modeling the profile of the edge of the road. The modeling of the profile of the edge of the road in the form of a polynomial makes it possible to represent the profiles of the edge of the road more or less accurately according to the degree of the polynomial. It will be understood that a first degree polynomial function, of the form $y=f(x)=Bi.x+Ai$, where Ai and Bi are parameters, and x and y are coordinates of a point on the road edge in the plan of the road (assuming, by approximation, a planar road), makes it possible to model a rectilinear road profile. A second degree polynomial function, of the form $y=f(x)=Ci.x^2+Bi.x+Ai$, Ci, Bi and Ai being parameters, makes it possible to model a parabolic road profile, for example a turn. A third degree polynomial function, of the form $y=f(x)=Di.x^3+Ci.x^2+Bi.x+A$, Di, Ci, Bi and Ai being parameters, makes it possible to model a road profile including an inflection point, for example a succession of two turns.

For each of these polynomial equations defined above, Ai is an iterative constant which relates either to a right edge 161 of the road 160, in which case i=1, or to a left edge 163 of the road 160, in which case i=3, or to the center 162 of the road 160, in which case i=2. Bi is the iterative constant which relates to the representation of the affine straight line of the right edge 161 of the road 160, in which case i=1, or of the left edge 163 of the road, in which case i=3, or of the center 162 of the road 160, in which case i=2. Ci is an iterative constant which relates to the representation of the curvature of the right edge 161 of the road 160, in which case i=1, or of the left edge 163, in which case i=3, or of the center 162 of the road 160, in which case i=2. Di is an iterative constant which relates to a double curvature of the right edge 161 of the road 160, in which case i=1, or of the left edge 163 of the road 160, in which case i=3, or of the center 162 of the road 160, in which case i=2.

Thus, when the camera 121 has acquired an image of the road 160 stretching in front of the host vehicle 100, said camera 121 is able to transmit, to the control device 130, the x and y coordinates according to the profile of the right edge 161, left edge 163 and center 162 of the road 160. The control device 130 determines the distance Ai between the virtual projection of the axis Ac of the camera 121 on the plane Pr of the road 160 and respectively the right edge 161, left edge 163 and the center of the road 160.

According to one embodiment, and as detailed later, the parameters of the polynomial may vary dynamically. The parameters are for example updated by the camera, the radar, or the lidar, at a given frequency or upon detection of a variation in the profile of the road. Preferably, the invention provides for the use of a third degree polynomial function, thus providing an optimized trade-off between complexity and accuracy. Specifically, the road profiles in a field of view FOV of a camera 121 are, generally speaking, rarely more complex than a succession of two turns, and the use of polynomial functions of a degree higher than or equal to four would lead to substantial computing times in the data processing unit of the control device. Alternatively, provision may be made for an adaptive selection of the degree of the polynomial function to be provided, with real-time adaptation of the degree of the polynomial function according to the image in question. Of course, the present invention is in no way restricted to the use of a polynomial function for estimating the profile of the road edge. It extends to any other type of function, for example trigonometric, logarithmic, exponential, etc.

Thus, when the parameters Ai, Bi, Ci, Di have been defined according to the profile of the road, the control device 130 determines, in a step 203, a starting point Pd and an end point Pa of a zone ZPd, ZPg, ZP for the projection of patterns 170. The projection distance DP is defined as being the distance between the proximal point Pd and the distal point Pa of the projection zone ZPd, ZPg, ZP. Pd is a parameter that is predefined by default by the maker of the host vehicle 100, but it may also be modifiable by the driver or the operator using said host vehicle. Pa is a parameter that reaches its maximum value when no obstacle is detected by the data/image acquisition means. Thus, when an obstacle 180 appears in the field of view of the data/image acquisition means 121, a safety margin MS is then predefined by the control device 130 so as to prevent patterns 170 from being projected onto the obstacle 180. The means for acquiring data and/or images relating to the road 160 stretching in front of the host vehicle 100 are able to determine the type of obstacles 180. No fewer than six categories of obstacles 180 are referenced. Thus, 0 corresponds to an unclassified object, 1 corresponds to an unknown object of small size, 2 corresponds to an unknown object of large size, 3 corresponds to a pedestrian, 4 corresponds to a bicycle, 5 corresponds to a motor car, and 6 corresponds to a truck.

The control device 130 determines, in a step 204, a distance Dc by default between the virtual projection onto the plane Pr of the road of the axis Ac of the camera 121 and the projection zones ZPd, ZPg of patterns 170, respectively for a right projection zone ZPd and a left projection zone ZPg. The virtual projection onto the plane of the road Pr of the virtual axis Ac of the camera 121 appears as an axis of symmetry between the projection zones Zpd and Zpg. However, this distance Dc may be configured either according to the type of pattern 170 selected by the driver or the operator of the host vehicle 100. Indeed, in one alternative embodiment, the distance Dc=0 so that the projection zones ZPd and ZPg of patterns 170 are superposed, so as to have one and the same projection zone Zp.

The list of patterns 170 able to be projected in the projection zone ZPd, ZPg, ZP is not exhaustive, and it may be defined by the maker of the host vehicle 100 and/or updated by the driver or the operator according to their needs. As an example of the type of pattern 170 able to be projected by the right projection module 141 and the left projection module 143, a circle, square, triangle, chevron, or a continuous or broken line may be projected. Thus, in a step 205, the control device 130 determines the width Lm of the pattern 170. This value is defined by default by the maker of the host vehicle 100 but it is parameterizable by the driver or the operator using said host vehicle 100. In order to compensate the potential low resolution of some projection modules 140, the method according to the invention is able to dynamically increase the width of the patterns 170 projected farthest away onto the road in order to correct the effect of perspective. The distance Dm between each projected pattern 170 may also be parameterizable by the driver or the operator using said host vehicle 100, so as to provide better visual comfort.

The control device 130 according to the invention comprises a step 206 for allowing self-calibration of the projection modules 140 so that the projection of a pattern 170 by the right projection module 141 and the left projection module 143, respectively, is symmetrical with respect to the virtual axis of camera 121 projected onto the road 160. This step of self-calibration of the projection modules 140 is also able to mechanically and/or digitally configure said projection modules 140 so that the projection of a pattern 171, 173 by the right module 141 and the left module 143, respectively, allows the two patterns 170 to be superposed in order to form one single pattern 172.

With the projection modules 140, the beam relating to the low-beam function is split with the juxtaposition of a lower portion called the "flat-beam" base beam and an upper portion called the "kink" which is intended to illuminate the road 160 while avoiding dazzling other users. Likewise, the beam relating to the "high-beam" function is split with the superposition of the "flat-beam" base beam and a "head-beam" central portion with a restricted and more intense base. The patterns 170 are intended to be projected with a beam from the low beam or the high beam.

In one embodiment, the control device 130, associated with a set of sensors 120 for determining the pitch 122 of the host vehicle 100 and taking into account the altitude and/or roll of the projection module 140, is configured so as to compensate the mechanical and/or digital calibration of the projection modules 140 so that the projection of the patterns 170 remains stable and comfortable for the driver and/or the operator using the host vehicle 100.

The control device is able to compensate the light intensity according to the distance of projection of the patterns and the "flat-beam" base beam.

By means of the control method according to the invention, associated with the data/image acquisition means, the control device is able to determine whether the outline of the vehicle is able to pass between two obstacles 180.

Figure 6:
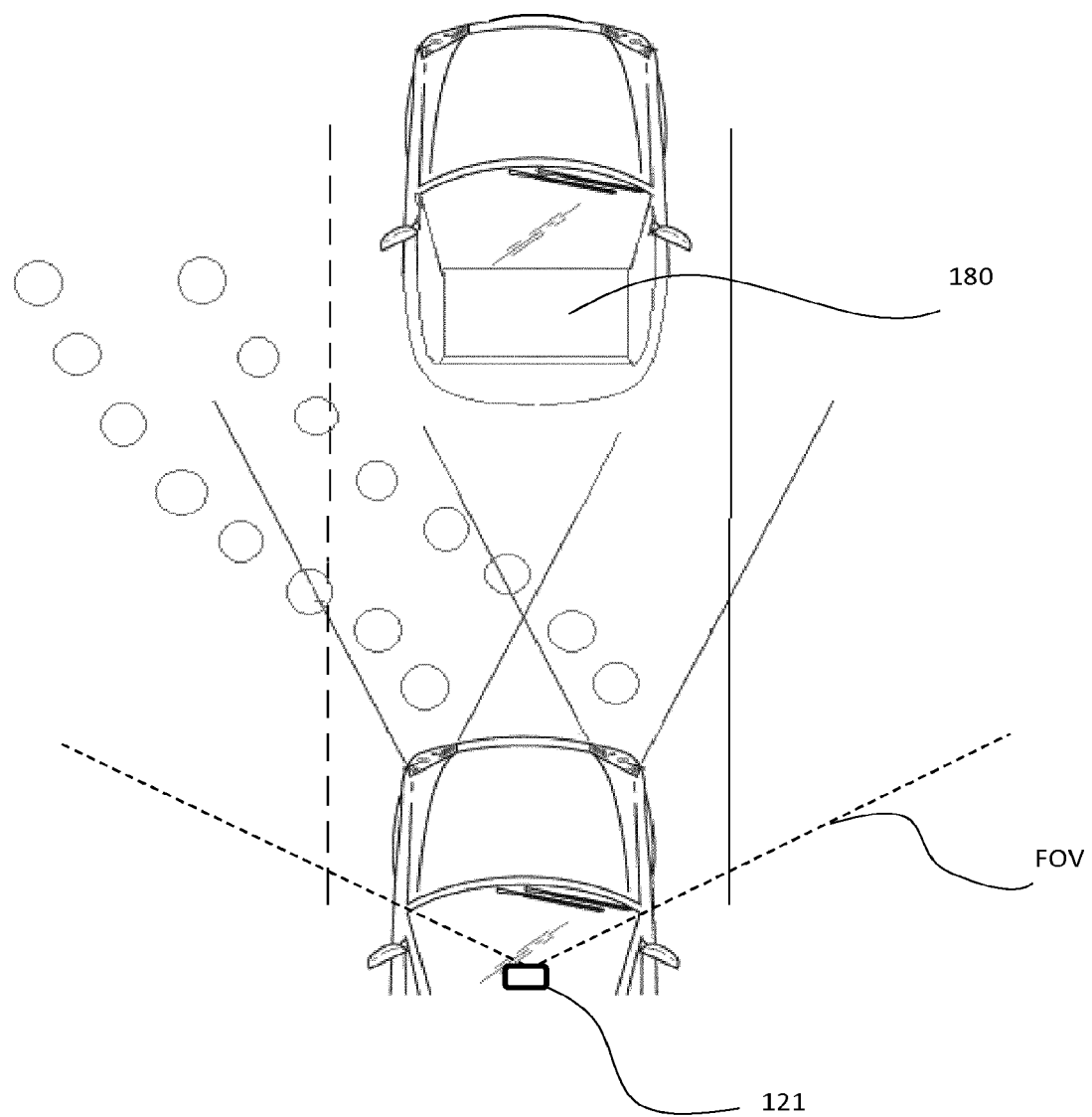
FIG. 6 illustrates the implementation of the method according to the invention in a fourth driving situation.

In another embodiment, the control device 130 associated with the data/image acquisition means is able to project an obstacle 180 avoidance strategy (see FIG. 6).

In another embodiment, the control device 130 associated with the data/image acquisition means is able to project a trajectory for the host vehicle 100 when the lane narrows in the area of works.

In another embodiment, the control device 130, associated with the "GPS" navigation system of the vehicle 123, is able to project a change of trajectory for the host vehicle 100.

In another embodiment, the control device, associated with the means for acquiring data/images and/or for detecting line crossing, is able to project a trajectory assist so that the host vehicle 100 stops going over the marking lines on the road and has a stable trajectory.

In another embodiment, the control device, associated with the data/image acquisition means, is able to project a virtual marking onto the road when they have disappeared or are not visible.

In one alternative embodiment of the invention, a device 180 for fusion of information is able to determine the relevance of each datum from the various sensors associated with the host vehicle 100, in order to transmit, to the control unit 150 of the vehicle 100 and consequently to the control device 130, reliable data for aiding in decision making.

In another embodiment of the invention, the host vehicle 100 is able to be completely self-driving, so as to require no driver in order to follow a predetermined trajectory.

The invention claimed is:

1. A method for controlling projection modules for projecting pixelated light beams from a host vehicle, the host vehicle comprising
   a set of sensors, and
   at least one device for controlling light beam projection modules,
   wherein the method comprises:
   collecting, via a data acquisition device, a set of data used to model a profile of a road stretching in front of the host vehicle;
   determining, via a control device and according to the set of data collected, a polynomial function modeling the profile of an edge and of a center of the road, such that
      the modeling of the profile of the road results from a first degree polynomial function of the form $y=f(x)=Bi.x+Ai$ when the profile of the road is rectilinear,
      the modeling of the profile of the road results from a second degree polynomial function of the form $y=f(x)=Ci.x^2+Bi.x+Ai$ when the profile of the road is parabolic, or
      the modeling of the profile of the road results from a third degree polynomial function of the form $y=f(x)=Di.x^3+Ci.x^2+Bi.x+A$ when the profile of the road comprises an inflection point;
   determining, via the control device, a starting point (Pd) and an end point (Pa) of a projection zone for projection of patterns;
   determining, via the control device, a distance (Dc) between an axis (Ac) of the data acquisition device and patterns of a right projection zone of the projection zone and patterns of a left projection zone of the projection zone; and
   determining, via the control device, a width (Lm) of the patterns.

2. The method for controlling projection modules as claimed in claim 1, wherein the data acquisition device is a camera, a radar device, and/or a lidar device.

3. The method for controlling projection modules as claimed in claim 1, wherein when the data acquisition device detects an obstacle, the data acquisition device transmits, to the control device, data relating to the obstacle and defining a safety margin (MS) to prevent patterns from being projected onto the obstacle.

4. The method for controlling projection modules as claimed in claim 1, wherein the distance Dc is parameterizable according to a type of pattern projected.

5. The method for controlling projection modules as claimed in claim 4, wherein, when the distance Dc=0, the control device controls the light beam projection modules such that the patterns of the right projection zone and the patterns of the left projection zone are superposed in the projection zone.

6. The method for controlling projection modules as claimed in claim 1, wherein the patterns projected into the projection zone are circles, squares, triangles, rectangles, chevrons, arrows, shapes, numbers, or continuous or broken lines.

7. The method for controlling projection modules as claimed in claim 1, further comprising controlling the light beam projection modules to dynamically increase the width (Lm) of the patterns projected farthest away onto the road.

8. The method for controlling projection modules as claimed in claim 1, wherein the control device is associated with the set of sensors, the set of sensors being configured to determine a pitch of the host vehicle and compensate a mechanical and/or digital calibration of the light beam projection modules.

9. The method for controlling projection modules as claimed in claim 1, further comprising controlling the light beam projection modules to compensate a light intensity according to a distance of projection of the patterns and a flat-beam base beam.

10. The method for controlling projection modules as claimed in claim 1, wherein the control device is configured to determine whether an outline of the host vehicle is able to pass between two obstacles by projecting the outline between the two obstacles.

11. The method for controlling projection modules as claimed in claim 10, wherein an orientation of the projection of the outline of the host vehicle is dynamically related to an angle of a steering system of the host vehicle.

12. The method for controlling projection modules as claimed in claim 1, further comprising controlling the light beam projection modules to project an obstacle avoidance strategy.

13. The method for controlling projection modules as claimed in claim 1, further comprising controlling the light beam projection modules to project a set of patterns configured to establish a trajectory for the host vehicle when a lane of the road narrows.

14. The method for controlling projection modules as claimed in claim 1, further comprising controlling the light beam projection modules to project a change of trajectory, in the form of arrows on the road, for the host vehicle when the control device is associated with a navigation system of the host vehicle.

15. A lighting device for a motor vehicle controlled by the control device, wherein the control device is configured to implement the method for controlling projection modules for projecting pixelated light beams as claimed in claim 1.

16. The lighting device for the motor vehicle as claimed in claim 15, further comprising a device for fusion of information configured to determine a relevance of each datum from the set of sensors associated with the host vehicle and transmit reliable data to the control device.

17. The method for controlling projection modules as claimed in claim 2, wherein when the data acquisition device detects an obstacle, the data acquisition device transmits, to the control device, data relating to the obstacle and defining a safety margin (MS) to prevent patterns from being projected onto the obstacle.

18. The method for controlling projection modules as claimed in claim 2, wherein the distance Dc is parameterizable according to a type of pattern projected.

19. The method for controlling projection modules as claimed in claim 2, wherein the patterns projected into the projection zone are circles, squares, triangles, rectangles, chevrons, arrows, or more complex shapes, numbers, or continuous or broken lines.

20. The method for controlling projection modules as claimed in claim 2, further comprising controlling the light beam projection modules to dynamically increase the width (Lm) of the patterns projected farthest away onto the road.

\* \* \* \* \*